(12) United States Patent
Malik

(10) Patent No.: US 8,562,789 B2
(45) Date of Patent: *Oct. 22, 2013

(54) WET-END MANUFACTURING PROCESS FOR BITUMEN-IMPREGNATED FIBERBOARD

(71) Applicant: W. R. Meadows, Hampshire, IL (US)

(72) Inventor: Tariq Mahmood Malik, Batavia, IL (US)

(73) Assignee: W. R. Meadows, Inc., Hampshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/748,238

(22) Filed: Jan. 23, 2013

(65) Prior Publication Data

US 2013/0133846 A1   May 30, 2013

Related U.S. Application Data

(60) Division of application No. 13/526,201, filed on Jun. 18, 2012, now Pat. No. 8,382,952, which is a continuation of application No. 13/248,758, filed on Sep. 29, 2011, now Pat. No. 8,241,463, which is a continuation of application No. 12/881,721, filed on Sep. 14, 2010, now Pat. No. 8,038,845, which is a division of application No. 12/200,993, filed on Aug. 29, 2008, now Pat. No. 7,815,772.

(51) Int. Cl.
*D21H 11/00* (2006.01)

(52) U.S. Cl.
USPC .......................................................... 162/171

(58) Field of Classification Search
USPC .................... 162/171, 170; 264/6, 11, 13
See application file for complete search history.

(56) References Cited

U.S. PATENT DOCUMENTS 4,052,492 A * 10/1977 Kontny et al. ................ 264/6
6,068,804 A *  5/2000 Betzner et al. ............. 264/86

* cited by examiner

*Primary Examiner* — Mark Halpern
(74) *Attorney, Agent, or Firm* — McAndrews, Held & Malloy, Ltd.

(57) ABSTRACT

A process for manufacturing fiberboard by preparing a fiber slurry mixture including containing cellulose fibers and water then atomizing a liquid bituminous material, such as asphalt. The liquid bituminous material is atomized by mixing it with a pressurized gas, such as compressed air, forming a mist comprising droplets of bituminous material having a diameter between 20 microns and 50 microns. A water spray solidifies the bituminous material droplets thereby forming bituminous particles which fall into the fiber slurry within the spray chamber. From there the slurry is sheared, dewatered, and dried, forming a finished fiberboard.

15 Claims, 4 Drawing Sheets

WET-END MANUFACTURING PROCESS FOR BITUMEN-IMPREGNATED FIBERBOARD

RELATED APPLICATIONS

This application claims priority to, and is a divisional application of, U.S. application Ser. No. 13/526,201, having a filing date of Jun. 18, 2012, which is incorporated herein by reference, and which claims priority to and is a continuation of U.S. application Ser. No. 13/248,758, having a filing date of Sep. 29, 2011, now U.S. Pat. No. 8,241,463, which is also incorporated herein by reference, and which claims priority to, and is a continuation of, U.S. patent application Ser. No. 12/881,721, having a filing date of Sep. 14, 2010, now U.S. Pat. No. 8,038,845, which is also incorporated herein by reference in its entirety, and which claims priority to, and is a divisional of U.S. patent application Ser. No. 12/200,993, having a filing date of Aug. 29, 2008, now U.S. Pat. No. 7,815,772, which is also incorporated herein by reference in its entirety.

BACKGROUND OF THE INVENTION

The present disclosure relates to a process for manufacturing fiber expansion joints. In particular, the present disclosure relates to a method for introducing fine particles of bituminous material, such as asphalt, into a slurry fiber mixture for formation into boards used in fiber expansion joint applications. Although the term "asphalt" is used throughout the present disclosure, it should be understood that any bituminous material, including tars and pitches, may be employed and still remain within the scope of the present disclosure.

Asphalt impregnated expansion joints are used in connection with concrete structures to relieve stresses created by thermal expansion and contraction of the concrete and prevent failure of the concrete caused by changes in ambient temperature. Typical applications for asphalt impregnated fiber expansion joints include sidewalks, driveways, floor slabs, streets, highways, airport runways, and similar applications. Because such concrete expansion joints are installed in applications exposed to the weather, it is desirable that water absorption be limited to prevent degradation of the expansion joint. It is also desirable that concrete expansion joints have strength and resiliency. Therefore, asphalt impregnated fiberboard expansion joints are required to meet or exceed the requirements of ASTM Standard Specification D 1751-04.

ASTM D 1751-04 requires that an expansion joint for concrete paving and structural applications have specified material characteristics, including that 35% weight of the finished fiberboard shall be asphalt uniformly distributed throughout the board. Additionally, the stress required to compress a test specimen of a fiber expansion joint to 50% of its original thickness must not be less than 100 psi nor greater than 750 psi. When a fiber expansion joint is compressed to 50% of its original thickness having three of its edges restrained, the amount of extrusion of the free edge cannot exceed 0.25 inch. A fiber expansion joint that has been compressed to 50% of its original thickness must recover at least 70% of its thickness within 10 minutes after the applied load is released. A fiber expansion joint must not have a density less than 19 lb./cu. ft. A fiber expansion joint test specimen with four square-cut edges, when submerged horizontally under 1 inch of water at 70 degrees F. may not absorb more than 15 volume % in 24 hours for a nominal volume of ½ inch and no more than 20 volume % for all other thicknesses.

Fiber expansion joints have been made by saturating fiberboard in an asphalt/solvent solution, allowing the asphalt solvent mixture to be absorbed into the fibers, and allowing the solvent to evaporate. Fiber expansion joints have also been made by adding solid asphalt particles into a slurry of fibers. The asphalt particles are dispersed in the fiber slurry by mechanical mixing, and the slurry is dewatered, pressed into a board and dried.

BRIEF SUMMARY OF THE INVENTION

The present disclosure relates to a process for manufacturing fiberboard including the steps of preparing a fiber slurry mixture by adding a material containing cellulose fibers to water and agitating the fiber slurry mixture and transferring the fiber slurry mixture to a spray chamber. Then a bituminous material, such as asphalt, is heated to a temperature between 300 and 440 degrees F., wherein the bituminous material is in a liquid state. The liquid bituminous material is atomized within the spray chamber by mixing it with a pressurized gas, such as compressed air, forming a mist comprising droplets of bituminous material having a diameter between 20 microns and 50 microns. A water spray solidifies the bituminous material droplets thereby forming bituminous particles which fall into the fiber slurry within the spray chamber. From there the slurry is sheared, dewatered, and dried, forming a finished fiberboard.

The present disclosure also relates to a process for atomizing a bituminous material, such as asphalt, to produce solid particles ranging in size from 20 microns to 50 microns. A bituminous material is heated to a temperature between 300 and 450 degrees F., wherein the bituminous material is in a liquid state. The liquid bituminous material is atomized by mixing the liquid bituminous material with a gas, such as compressed air, by passing each through a nozzle. The gas is supplied at a pressure between 10 psi and 50 psi, but preferably between 20 psi and 40 psi and a temperature between 200 degrees F. and 300 degrees F. Mixing the liquid bituminous material and the compressed gas produces a mist of bituminous droplets having a diameter between 20 microns and 50 microns. A water spray having a temperature between 40 degrees F. and 60 degrees F., but preferably between 45 degrees F. and 55 degrees F. is applied to the bituminous mist, solidifying the bituminous material droplets and thereby forming bituminous particles having a diameter between 20 microns and 50 microns.

BRIEF DESCRIPTION OF SEVERAL VIEWS OF THE DRAWINGS

The present disclosure will be described hereafter with reference to the attached drawings which are given as a non-limiting example only, in which.

DETAILED DESCRIPTION OF THE INVENTION

The process for manufacturing an asphalt-impregnated fiberboard of the present disclosure introduces fine asphalt particles into a fiber slurry by atomizing molten asphalt and spray cooling the atomized asphalt. The asphalt particles may then be added directly to the fiber slurry or stored for later use.

Figure 1:
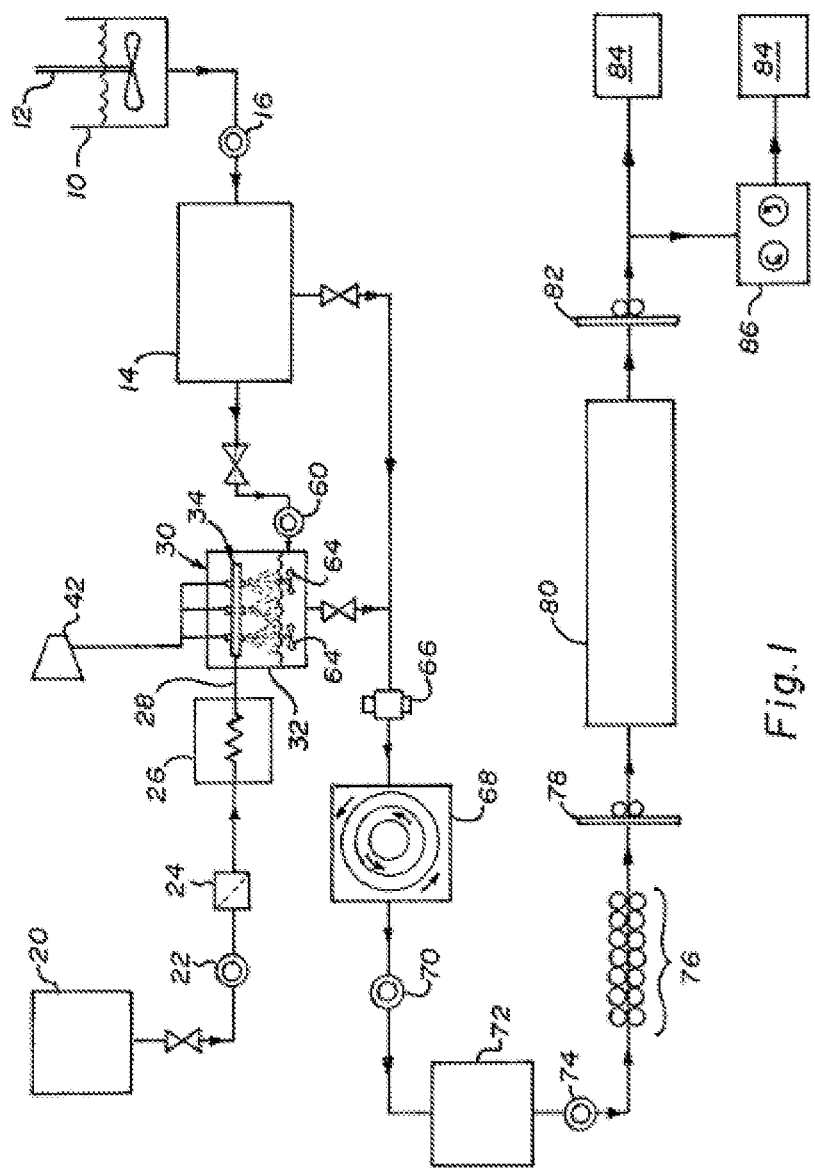
FIG. 1 is a schematic representation of the process of the present disclosure.

Referring now to FIG. 1, a fiber slurry is prepared in a pulper 10 by adding material containing cellulose fibers, such as wood pulp, sugar cane, switch grass, straw, recycled paper pulp, or other cellulose containing organic material to water. A mixer 12, agitates the fiber slurry, maintaining the fibers in suspension. The fiber slurry is transferred to a pulp chest 14 where it is held while awaiting further processing, depending on production parameters. Depending on the application, a pump 16 may be used to transfer the fiber slurry from the pulper 10 to the pulp chest 14. Alternatively, the fiber slurry may be transferred by gravity into the pulp chest 14.

Asphalt is heated in a tank 20 to a temperature between 300 and 440 degrees F. At this temperature, the asphalt is in a liquid phase and flows freely. From the tank 20, a pump 22 transfers the molten asphalt through a filter to remove any impurities such as solids or coking that may have formed during the heating process. A heater 26 is provided to further heat the molten asphalt to a temperature between 400 and 450 degrees F. The heater 26 also provides heat to the piping carrying the molten asphalt to the spray chamber 30.

In an exemplary embodiment, the heater 26 is a shell and tube heat exchanger having hot mineral oil on the shell side and the molten asphalt on the tube side. The heater maintains mineral oil at a temperature of approximately 600 degrees F. The mineral oil is circulated within the shell side of the heater, transferring heat to the molten asphalt as it passes through the tube side of the heater. The asphalt transfer piping 28 is constructed of double lumen pipe, wherein the heated oil circulates through an outer lumen to maintain the temperature of the molten asphalt as it is flows through an inner lumen as it is transferred from the asphalt tank to the spray chamber.

Figure 2:
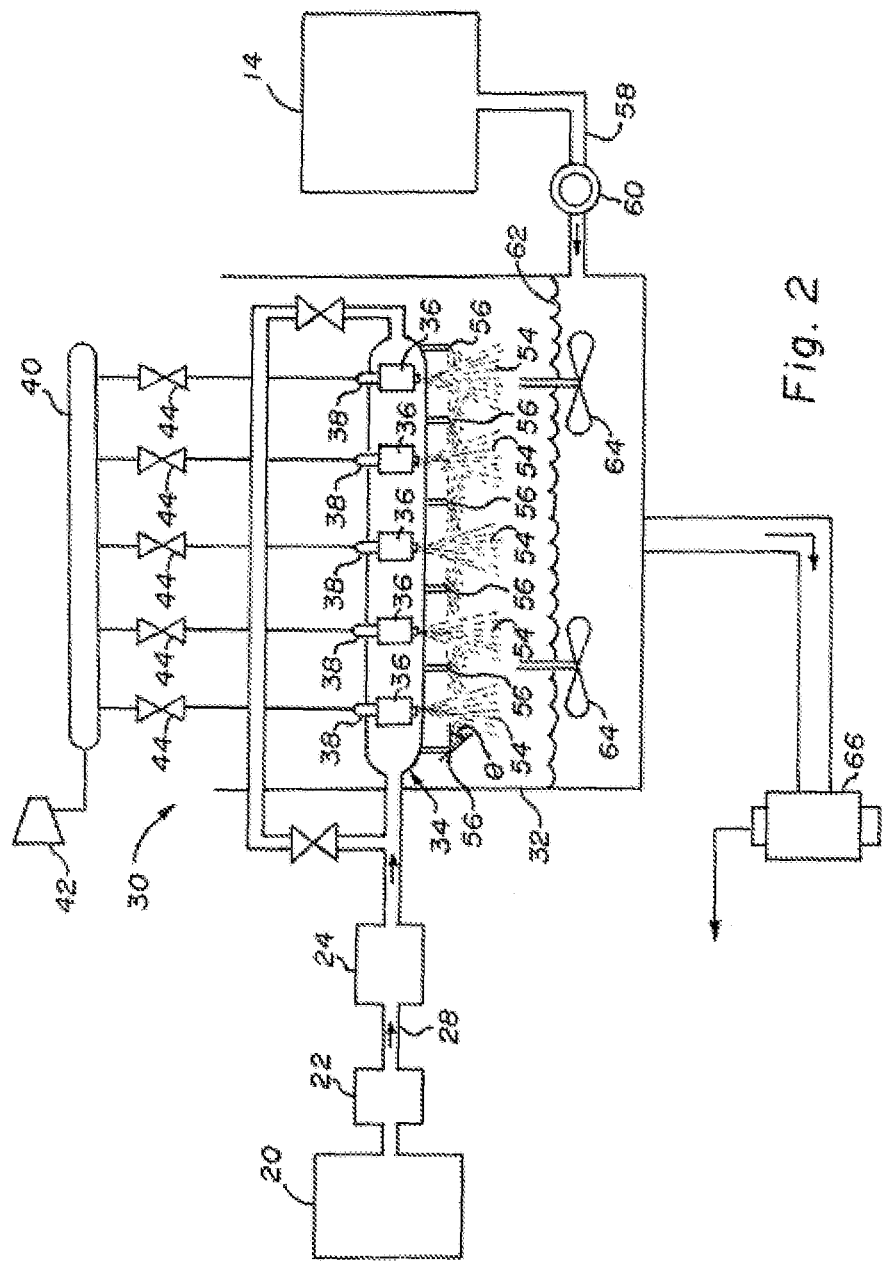
FIG. 2 is a schematic representation of the spray tank of the present disclosure.

Referring now to FIG. 2, the spray chamber 30 includes a housing 32, enclosing an atomization head 34. The atomization head 34 includes a plurality of asphalt nozzles 36. Each nozzle is connected to the asphalt piping 28. In an exemplary embodiment, a pump 38 is connected in-line with each nozzle 36 for metering the flow of asphalt. Each nozzle 36 is also connected to a pressurized air manifold 40.

An air compressor, 42 supplies a source of compressed air which is dried and heated to a temperature between 200 degrees F. and 300 degrees F. The dried compressed air is provided to each nozzle 36 through a solenoid valve 44. The solenoid valve 44 allows the compressed air to be applied to only those nozzles 36 in use providing bitumen to the slurry in the spray chamber 30. The compressed air may be provided at a pressure between 10 psi and 50 psi. In an exemplary embodiment, the compressed air is provided at a pressure of between approximately 20 psi and 40 psi. It has been found that moist air causes the molten asphalt to solidify prematurely, resulting in clogging of the nozzles. It is therefore desirable that the compressed air be passed through a suitable commercially available air dryer before it is introduced into the process.

Figure 3:
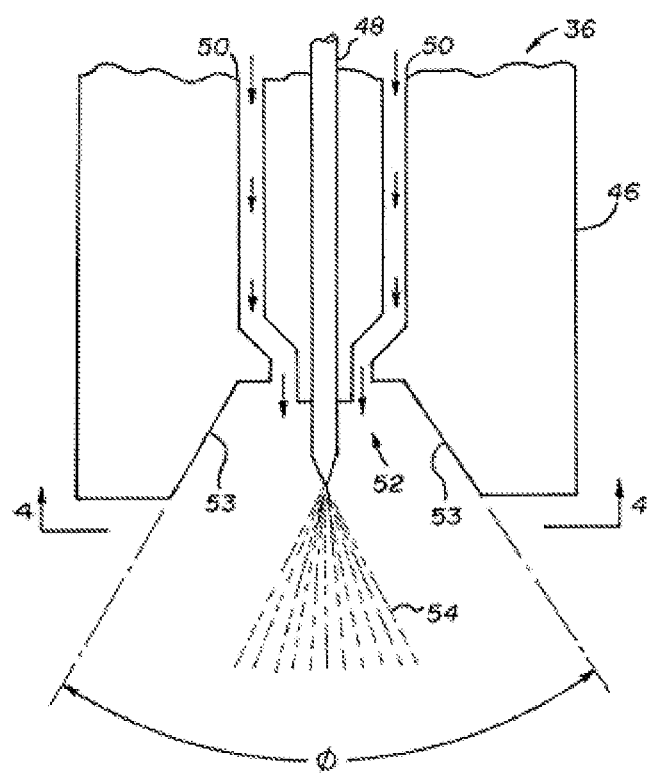
FIG. 3 is a section view of an asphalt spray nozzle.
Figure 4:
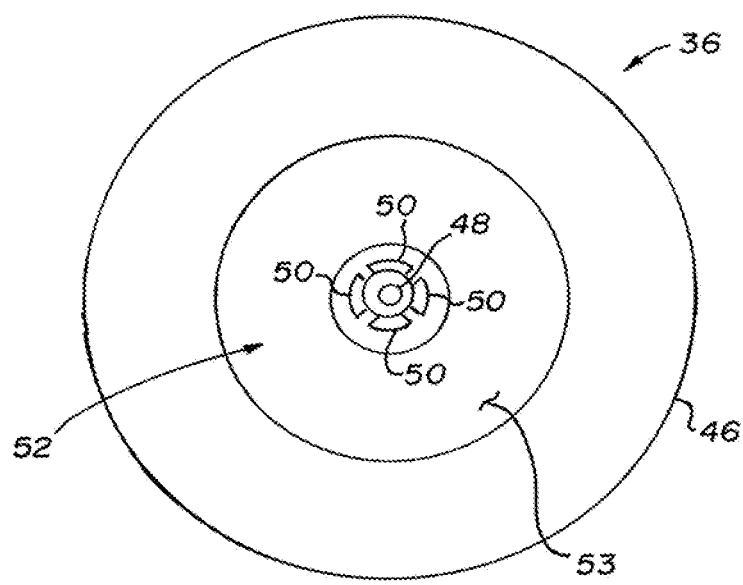
FIG. 4 is an end view of the nozzle shown in FIG. 3.

Referring to FIGS. 3 and 4, each nozzle 36 includes a body 46 having a liquid passage 48, through which molten asphalt flows, surrounded by a plurality of gas passages 50, which provide pressurized air as shown in FIGS. 3 and 4. The liquid passage 48 and the gas passages 50 discharge into an atomization chamber 52. The liquid passage 48 may be located along the longitudinal axis of the nozzle body 46 and gas passages 50 symmetrically disposed about liquid passage 48. Such a nozzle design is shown in U.S. Pat. No. 6,997,405 which is herein incorporated by reference. The atomization chamber 52 is configured to combine the molten asphalt and the pressurized air to produce an asphalt mist 54. The atomization chamber 52 includes a conical wall 53 having an angle φ which may be varied depending on the desired atomization pattern. In an exemplary embodiment of the present disclosure, the atomization chamber 54 has a wall angle φ of 45 degrees, which produces a conical spray pattern having a vertex angle of 45 degrees. The atomized asphalt mist 54 is discharged from atomization chamber 54 as liquid asphalt droplets having a diameter of approximately 20 to 50 microns. The size of the asphalt droplets may be varied by adjusting the air pressure. Generally, higher air pressure produces atomized asphalt having a smaller particle size.

The spray chamber 30 shown in FIG. 2 depicts five spray nozzles for clarity. However, in an exemplary embodiment of the present disclosure, the spray chamber 30 includes a spray head 34 having twelve spray nozzles 36. Each spray nozzle is designed for an asphalt flow rate of 1 gal/min. Having solenoid valves controlling the asphalt flow to individual nozzles allows for varying the asphalt flow rate depending on the desired production rate and/or asphalt concentration for the finished product. For example, the amount of asphalt added to the fiber slurry may be adjusted from about 1 gal/min, with a single solenoid valve open at a minimum production rate to about 12 gal/min at high production rates. Also, the number of nozzles in operation may be driven as a function of the desired asphalt content in a finished product.

The spray chamber 30 also includes a plurality of water spray heads 56 arranged proximate to the discharge of the asphalt nozzles 36. The water spray heads 56 are connected to a supply of chilled water maintained at a temperature of approximately 40 degrees F. to 60 degrees F. In an exemplary embodiment of the present disclosure, the chilled water is provided at a temperature between 45 degrees F. and 55 degrees F. The spray heads 56 are configured to direct a water mist towards the atomized asphalt discharge at a spray angle θ of approximately 45 degrees downward. The chilled water mist solidifies the molten droplets of the atomized asphalt mist, forming solid asphalt particles having a size of 20 to 50 microns.

A pulp supply line 58 connects the pulp chest 14 to the spray chamber 30. A slurry feed pump 60 is provided in the pulp supply line 58 to transfer the fibrous material slurry from the pulp chest 14 to the spray chamber 30. The slurry feed pump 60 may be of variable speed and connected to a control system (not shown) to accommodate variable production throughput.

The fibrous material slurry is pumped into the spray chamber 30 to a predetermined level 62. As the molten asphalt mist 54 is cooled and the asphalt droplets solidify, fine asphalt particles drop into the fibrous material slurry in the bottom of the spray chamber 30. One or more mechanical mixers 64 agitate the fibrous material slurry, maintaining a homogeneous mixture of fibers and asphalt particles.

The slurry in the spray chamber 30 should contain about 8% weight to about 10% weight fiber or solid content. The slurry should also contain about 10% weight to about 30% weight asphalt.

A discharge pump 66 is connected to the outlet of the spray chamber 30 and directs the slurry to the next step in the process. The discharge pump 66 may be coordinated with the fibrous slurry feed pump 60 to maintain a predetermined slurry level and dwell time within the spray chamber 30.

From the spray chamber 30, the slurry is transferred to a refiner 68 where the slurry is sheared by a series of mixing plates. The mixing plates are mounted on a shaft and rotate relative to each other. As the slurry flows through the refiner, it passes between the mixing plates, shearing the slurry and in the process shredding the fibrous material. The shredding of the cellulose fibers forms a large amount of surface area for interaction with and dispersion of the asphalt particles, allowing for even distribution of the asphalt particles throughout the fibers.

Additional ingredients may be added to the slurry including waxes, starches, alum, and other fillers and agents. These additional ingredients and fillers may be added at any point in the process prior to dewatering where they will become intermixed with the other components, as is known in the art. For example a wax, such as paraffin, may be added to the slurry in a concentration of about 1.0% weight to about 2.5% weight; starch may be added in a concentration of about in a concentration of about 1.0% weight to about 3.0% weight; and aluminum sulfate may be added in a concentration of about 1.0% weight to about 2.0% weight.

In an alternative embodiment of the present disclosure, a dye may be added to the slurry before drying. The dye serves to color the fibrous material to produce an evenly colored finished fiberboard improving the aesthetic appearance of the fiberboard. The addition of a dye, also serves to regulate the pH of the slurry. The dye should have a pH of about 6 to about 8. It has been discovered that a slurry having a pH of approximately 6.8 has been found to promote better adhesion of the asphalt particles to the cellulose fibers, and thus improved distribution of asphalt throughout the finished fiberboard. The dye may be a generally commercially available water-based dye. Alternatively, a solvent based dye may be used. However, a solvent-based dye contains volatile compounds which may be harmful to the environment and which may present the risk of fire or explosion when subjected to heat while drying.

A slurry transfer pump 70 pumps the slurry mixture from the refiner 68 to a ready chest 72 where it is held for dewatering. Another transfer pump 74 pumps the slurry from the ready chest 72 to a Fourdrinier-type press 76 as is commonly known in the art, where the slurry is dewatered and formed into a wet fiber mat.

After the dewatered wet mat leaves the Fourdrinier press 76, the mat passes through a shear 78 where it is cut before being fed into a dryer 80. The mat is dried for approximately 1-3 hours depending on its physical characteristics. The finished fiberboard preferably should have about 10% weight to about 40% weight total asphalt content and less than about 3% total moisture content. After being dried, the fiberboard may pass through a second shear 82 again be cut to a commercially desirable size. The finished fiberboard may then be stacked 84 for further processing or for shipment.

Alternatively, an additional coating of asphalt or other petroleum fluid may be applied to the outer surface of the fiberboard to provide additional resistance to moisture penetration. A coater 86 applies by roller the additional coating to the major surfaces of the fiberboard. For example, a commercially available hot melt double-sided roller coater manufactured by the Black Bros. Co. may be used. Fluids such as flux oil or fuel oil, in addition to asphalt, have been found to resist water penetration into the finished fiberboard.

Although ASTM D 1751-04 specifies that the finished fiber board have an asphalt content of at least 35.0% weight, a number of tests were preformed on fiber boards manufactured by the process of the present disclosure, varying the % weight of asphalt. For example, an asphalt-impregnated fiberboard manufactured by the process of the present disclosure containing 15% weight asphalt was tested according to ASTM Method D 545. The results are summarized in Table 1 below:

TABLE 1

| Property | Test Results | ASTM 1751-04 |
|---|---|---|
| asphalt content 15% weight | | |
| Compression (psi) | 150 | Pass |
| Extrusion (in.) | 0.30 | Fail |
| Recovery (%) | 65 | Fail |
| Density (lb./cu. Ft.) | 20 | Pass |
| Water absorption | 24 | Fail |

A second test was performed on a fiberboard containing 25% weight asphalt content. The results are summarized in Table 2 below:

TABLE 2

| Property | Test Results | ASTM 1751-04 |
|---|---|---|
| asphalt content 25% weight | | |
| Compression (psi) | 350 | Pass |
| Extrusion (in.) | 0.25 | Pass |
| Recovery (%) | 75 | Pass |
| Density (lb./cu. Ft.) | 21 | Pass |
| Water absorption (volume %) | 19 | Fail |

A third test was performed on a fiberboard containing 35% weight asphalt content. The results are summarized in Table 3 below:

TABLE 3

| Property | Test Results | ASTM 1751-04 |
|---|---|---|
| asphalt content 35% weight | | |
| Compression (psi) | 540 | Pass |
| Extrusion (in.) | 0.15 | Pass |
| Recovery (%) | 78 | Pass |
| Density (lb./cu. Ft.) | 22 | Pass |
| Water absorption (volume %) | 12 | Pass |

The process of the present disclosure allows introduction of very fine asphalt particles into the fibrous slurry mix. It has been discovered that small asphalt particle size allows for better dispersion of the asphalt throughout the fibers and increased bonding between asphalt and fiber. Thus a fiberboard may be produced exhibiting improved characteristics over asphalt-impregnated fiberboards produced by methods presently known in the art.

While this disclosure has been described as having exemplary embodiments, this application is intended to cover any variations, uses, or adaptations using the general principles set forth herein. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

The invention claimed is:

1. A method of making a fiberboard or expansion joint having an improved distribution of bituminous particles throughout the finished fiberboard or expansion joint, comprising the steps of:

preparing a slurry mixture comprising fibrous material, bituminous particles having a particle size of between approximately 20 microns to 50 microns and water;

dewatering the slurry containing the fibrous material and bituminous particles, leaving a wet mat containing fibers and bituminous particles; and drying the wet mat thereby forming the fiberboard or expansion joint.

2. The method of claim 1, further comprising the step of applying a coating to either or both major sides of the dried fiberboard or expansion joint.

3. The method of claim 1, wherein the bituminous particles are asphalt particles.

4. The method of claim 3, wherein the asphalt particles are natural asphalt particles.

5. The method of claim 3, wherein the asphalt is a synthetic or non-natural asphalt.

6. The method of claim 1, wherein the bituminous particles are asphalt powder particles.

7. The method of claim 1, wherein the method further comprises the step of adding an additive.

8. The method of claim 7, wherein the additive is a powdered asphalt.

9. The method of claim 1, wherein the method further comprises the step of adding a dye to the slurry.

10. The method of claim 9, wherein the dye comprises greater than about 0.001% weight of the slurry but less than about 2.0% weight of the slurry.

11. The method of claim 9, wherein the dye exhibits a sufficient pH to promote adhesion of the bituminous particles to the cellulose fibers.

12. The method of claim 11, wherein the sufficient pH of the dye is a pH between about 6 to about 8.

13. The method of claim 12, wherein the dye has a pH of 6.8.

14. The method of claim 9, wherein the dye is selected from the group consisting of a water based dye and a solvent based dye.

15. The method of claim 9, wherein the wet mat containing fibers and bituminous particles has an even color distribution.

* * * * *